Patented Jan. 20, 1953

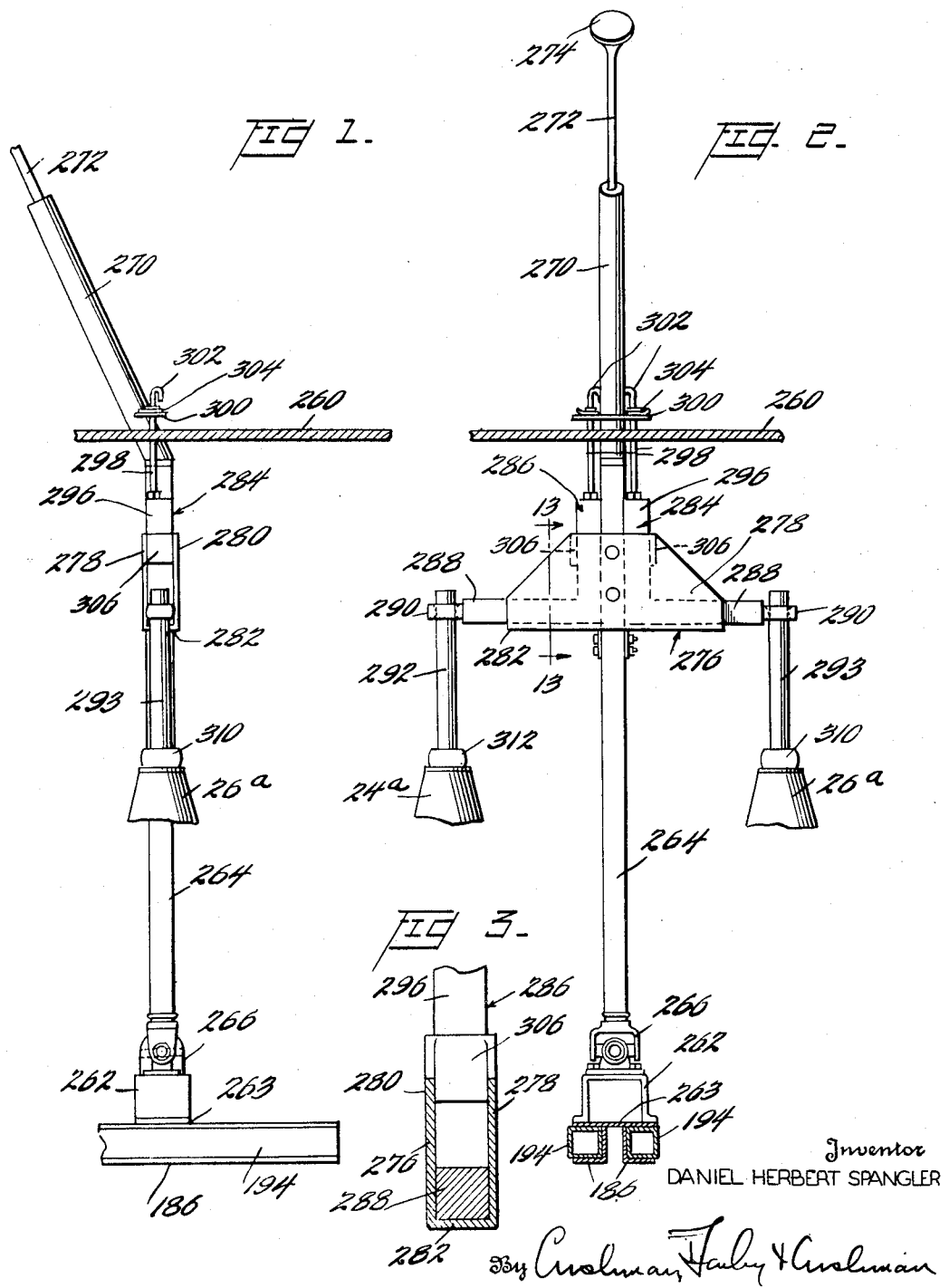

2,625,836

UNITED STATES PATENT OFFICE 2,625,836

GEAR SHIFT MECHANISM

Daniel Herbert Spangler, Hamburg, Pa.

Original application November 4, 1948, Serial No. 58,178. Divided and this application January 24, 1951, Serial No. 207,611

6 Claims. (Cl. 74—473)

1

The present invention relates to gear shift mechanisms. The application is a division of my application for Motor Vehicles, Serial No. 58,178, filed November 4, 1948.

Large capacity trucks now in operation include motors, transmissions, wheels, axles and tires of substantially larger and far more expensive types than the much more numerous lower capacity trucks, for example, trucks driven by a one hundred horsepower motor. For that reason, the initial cost of a large capacity truck is proportionately much greater than that of a truck of lower capacity. Also, because in the large capacity trucks, the above-mentioned parts or elements are of special design, they can only be serviced by especially trained mechanics working in especially equipped service plants. These factors make large capacity trucks proportionately more expensive to operate and maintain than trucks of lower capacity.

An object of the present invention is to provide a truck having a load capacity equal to the maximum load limit and size, but which truck is so designed that it may be constructed of the parts ordinarily provided upon trucks of much lower capacity.

Attainment of the above object enables the vehicle of the present invention to be produced of standard parts of relatively low cost, with the result that the first cost of the truck will be relatively low. In addition, because the parts used are of widely known and used types, the vehicle can be serviced by mechanics at a service station provided only with normal equipment, viz., equipment such as is widely provided for work upon smaller and more widely used trucks.

In order to compensate for the high cost of motors and other elements of the usual high capacity truck, most operators use tractors and trailers to thereby offset high costs by increased availability of loading. This advantage is substantially offset by the lower safety factor involved in the use of trailers. In any event, because the vehicle of the present invention can be built of standard and relatively low-priced elements, the initial cost of a given number of the vehicles of the present invention will be less than, or will very favorably compare with, the cost of the number of tractors and trailers necessary to give the same availability of loading.

Said original application discloses a vehicle including a plurality of selectively usable motors. A vehicle constructed in such manner is capable of being operated despite the failure of one motor. In addition, if the load to be handled is less than the capacity of the motors, such motor or motors as are not required to handle the load may be disconnected from the driving wheels.

An object of the invention is to provide a gear shift for multiple motors and which will permit motors to be disconnected from the driving wheels.

Other objects and advantages of the invention will be apparent from the following specification and accompanying drawings.

In the drawings,

Figure 1 is a side elevation of the gear shift of the invention.

Figure 2 is a view of the gear shift taken at right angles to the Figure 1 showing and looking toward Figure 1 from the left, and Figure 3 is a detail section on the line 3—3 of Figure 2.

Referring to the drawings, the numeral 260 designates the floor of the vehicle cab 228, and the numeral 262 designates a bracket secured to a plate 263 which is welded to the upper edges of two bars 186 which extend between and above the transmissions 24a and 26a of the two internal combustion engines of the vehicle. As is disclosed in said original application, the motors lie side by side but with their center lines diverging about 12° toward the front of the vehicle. As explained in said original application, each motor is connected to one of the two rear axles of the vehicle. A master gear shift operating lever 264 has its lower end pivoted upon bracket 262 by means of a universal joint 266. Master lever 264 extends upwardly through the floor board 260, its upper portion 270 preferably being rearwardly angled as shown in Figure 1 from a point immediately below the floor board. Portion 270 has a rod 272 secured to its upper end which terminates in an operating knob 274 of usual form. The major portion of lever 264, including portion 270, is formed of square tubular material. Just below portion 270, lever 264 has a casing 276 fixed thereto, casing 276 comprising a plate 278 carried at the forward side of lever 264 and a plate 280 carried at the rearward side of the lever. The two plates are joined by a bottom wall 282. As is clear from Figure 2, the casing 276 is of substantial width laterally of lever 264. Key elements 284 and 286 of right angled form as viewed in front or rear elevation are mounted in the casing 276, one at each side of the lever 264. Each key element 284 has its horizontal leg 288 extending beyond the ends of the casing 276 and at their free ends the legs 288 carry eyelet members 290 apertured to surround the shift levers 292 and 293 of the transmissions 24a and 26a of the respective motors. The eyelet members 290 engage the levers 292 and 293 with such a fit that the eyelet members may slide vertically with respect to the levers and the levers may swing vertically with respect to the eyelet members. The shift levers 292 and 293 extend upwardly above the eyelet members 290 for a sufficient distance that a lever and an eyelet member cannot become disengaged during the normal shifting operations discussed below.

The vertical leg 296 of each key member 284 and 286 has a rod 298 extending upwardly therefrom, through the floor board, and thence through a horizontal plate 300 fixed to the lower end of portion 270 of master lever 268. The upper ends of the rods 298 may be bent as indicated at 302 to form a handle whereby they may be grasped and lifted. A fastening means 304 may also be provided upon the plate 300 to normally lock the rods 298 against upward movement with respect to casing 276 and master lever 264.

Two cross plates or webs 306 connect the plates 278 and 280, the webs being so positioned that they will be engaged by the outer surfaces of the vertical legs 296 of the angled members 284 and 286. In other words, the webs 306 serve to hold the angled members against lateral movement with respect to master lever 264. The webs 306 extend along the vertical legs 296 of each of the key members for a sufficient distance to prevent the vertical legs from rocking laterally and out of parallel relationship to the master lever 264. Because the master lever 264 is preferably square in cross section, and the same is true of the key members 284 and 286 (see Fig. 3), the key members, master lever 264 and casing 276 will have flat faces in contact.

The lower end of master lever 264, viz., the point 266 about which it universally pivots, lies on the same transverse line as the points about which the respective gear shift levers 292 and 293 universally pivot. However, as is shown in Figures 1 and 2, the universal joint 266 for master gear shift lever 264 is positioned a substantial distance below the points 310 and 312 upon which the transmission gear shift levers 292 and 293 are pivoted.

In the operation of the dual gear shift arrangement described above, with the levers in the neutral position illustrated in Figures 1 and 2, the shifting movement to low speed position would be accomplished by shifting master lever 264 to the left from the Figure 2 position and then to the rear as viewed in the Figure 1 position. The leftward movement from Figure 2 will cause the master lever 264 to rock on its pivot 266 while the two gear shift levers 292 and 293 will correspondingly rock on their respective pivots 310 and 312. During this movement, the eyelet member 290 of key element 286 will slide vertically along the gear shift lever 293 as the latter rocks laterally with respect to the eyelet member. Eyelet member 290 of key element 284 will also slide vertically along gear shift lever 292 as the latter rocks with respect to the eyelet member. When the rearward movement of the master lever 264 occurs, both eyelet members will slide upwardly along the gear shift levers 292 and 293, while the gear shift levers rock forward with respect to the eyelet members.

With the above explanation, the manner of operating the master lever 264 to simultaneously shift both of the levers 292 and 293 to any position will be apparent. The clutches associated with the internal combustion motors preferably will be fluid-operated from a common source so that an equal pressure will be exerted upon the clutches and simultaneous operation of both clutches thereby assured.

In the event that one of the motors becomes inoperative, or if for any reason it is desired to drive only one of the rear axles of the truck, the following operations will be performed. Master lever 264 will be shifted to the position of Figures 1 and 2 so that the respective transmissions 24a and 26a will be in neutral position. Then the key element 284 or 286 associated with the motor to be disconnected will be lifted vertically so as to disengage eyelet member 290 from the corresponding gear shift lever 292 or 293. Upward movement of a key member 284 or 286 can be accomplished by releasing the locking device 304 on plate 300 which normally engages the corresponding rod 298 to hold the key member against lifting or other movement with respect to the master lever. After a rod 298 and key member have been drawn upwardly as just described, the lock device 304 will again be engaged with the rod 298 to hold the key member in a position clear of the upper end of the gear shift lever 292 or 293. It will be observed from Figures 1 and 2 that when the upper surface of the horizontal leg 288 of a key member is in engagement with the lower edge of its retaining web 306, the eyelet member 290 of that key element will be out of engagement with the shift lever.

When a motor is to be removed from the vehicle as described in said original application, the key element 284 or 286 of the gear shift of that motor will be released as just described. Thus, it will be observed that the dual shift is readily releasable for all purposes.

As is described in said original application, the fuel feed system or carburetor as well as the transmission brakes of the two motors are simultaneously operable. It has already been explained that the two clutches are simultaneously operable. However, when the transmission of either motor has been disconnected from the master lever 264 as described above, all that will be necessary to keep that motor from operating will be to turn off its ignition. In other words, because the transmission of the motor is in neutral position and its ignition turned off, the motor can have no effect upon the further operation of the vehicle even if its accelerator and clutch are still operated. It will thus be seen that the invention involves a very efficient dual gear shifting arrangement which also readily is operable to enable a motor to be disconnected from its driving axle. Each motor will be of sufficient horse power to drive the truck at normal speeds and with a substantial load so that either motor may be disconnected when it is desired to do so. A separate ignition switch for each motor will be provided to permit such operation. Also, if a motor becomes disabled, the truck nevertheless can be operated at an entirely satisfactory speed and under full load so that it can reach a service station.

The terminology used in the specification is for the purpose of description and not of limitation, the scope of the invention being defined in the claims.

I claim:

1. Gear shifting mechanism for a pair of transmissions comprising a shift lever for each transmission, a master lever pivoted at a point between said shift levers, a pair of key elements respectively connecting said master lever to said shift levers, said key elements being individually slidable with respect to each other and to said shift levers.

2. Gear shifting mechanism of the character described in claim 1 wherein the key members are individually movable with respect to said master lever for disconnection from said shift levers.

3. Gear shifting mechanism of the character described in claim 2 including means engaged to each key element adapted to lock the key element alternatively in engaging or disconnected position with respect to the associated shift lever.

4. Gear shifting mechanism of the character described in claim 1 wherein the master lever is pivoted at a point lying in the same vertical plane as the pivot points of the shift levers.

5. A gear shifting mechanism for a pair of transmissions comprising a shift lever for each transmission, a master lever pivoted at a point between said shift levers, a casing fixed to said master lever, and including portions extending laterally therefrom toward the shift levers, a pair of key members, one in each laterally extending portion of said casing, individual means to hold said key members in alternative vertical positions with respect to said casing, said key members being provided at their outer ends with apertures adapted to slidably fit upon said shift levers.

6. A mechanism of the character described in claim 5 wherein the shift levers may rock relative to said key members.

DANIEL HERBERT SPANGLER.

REFERENCES CITED

The following references are of record in the file of this patent:

UNITED STATES PATENTS

| Number | Name | Date |
|---|---|---|
| 2,292,910 | Thornton | Aug. 11, 1942 |
| 2,428,647 | Boyer | Oct. 7, 1947 |
| 2,527,801 | Downing et al. | Oct. 31, 1950 |